United States Patent
Schmid et al.

(10) Patent No.: US 7,654,633 B2
(45) Date of Patent: Feb. 2, 2010

(54) DISSOLVING COMPLEXES OF ANIONIC DYE/CATIONIC POLYMERIC FIXER

(75) Inventors: Christian Schmid, San Diego, CA (US); Rodney D. Stramel, San Diego, CA (US); Yi-Hua Tsao, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 11/256,136

(22) Filed: Oct. 21, 2005

(65) Prior Publication Data

US 2006/0036002 A1 Feb. 16, 2006

Related U.S. Application Data

(62) Division of application No. 10/354,624, filed on Jan. 28, 2003, now Pat. No. 6,998,429.

(51) Int. Cl.
B41J 2/165 (2006.01)
(52) U.S. Cl. .............................. 347/28; 347/21; 347/95
(58) Field of Classification Search .................. 347/28, 347/35, 96, 95, 21, 33, 34, 29, 100, 31, 23
See application file for complete search history.

(56) References Cited

U.S. PATENT DOCUMENTS

| | | | |
|---|---|---|---|
| 5,825,380 A * | 10/1998 | Ichizawa et al. | 347/28 |
| 6,100,315 A * | 8/2000 | Kitamura et al. | 523/160 |
| 6,325,502 B1 * | 12/2001 | Shioya et al. | 347/96 |
| 6,342,105 B1 * | 1/2002 | Yano et al. | 347/22 |
| 6,384,210 B1 | 5/2002 | Blanchard | |
| 2002/0010115 A1 | 1/2002 | Yano et al. | |
| 2004/0080557 A1 * | 4/2004 | Iu et al. | 347/95 |

FOREIGN PATENT DOCUMENTS

| | | |
|---|---|---|
| EP | 0 697 445 A2 | 2/1996 |
| JP | 63-215781 A | 9/1988 |
| JP | 63-299971 A | 12/1988 |
| JP | 1990-0236741 | 9/1990 |
| JP | 07089092 | 4/1995 |
| JP | 11-157087 A | 6/1999 |
| WO | WO 02/36696 A2 | 5/2002 |
| WO | WO 02/45971 | 6/2002 |

OTHER PUBLICATIONS

ISP: Industrial Reference Guide: "Industrial Reference Guide-Performance-Enhancing Products For Industrial Markets": http://www.Ispcorp/com/products/industrial/ind_ref.html; Accessed: Dec. 31, 2005; 25 pgs.

* cited by examiner

Primary Examiner—Manish S Shah

(57) ABSTRACT

The invention relates to dissolving an anionic dye/cationic polymer complex including the step of applying to the complex a water-soluble solvent having a dielectric constant from 20 to 43 at standard temperature and pressure.

18 Claims, 4 Drawing Sheets

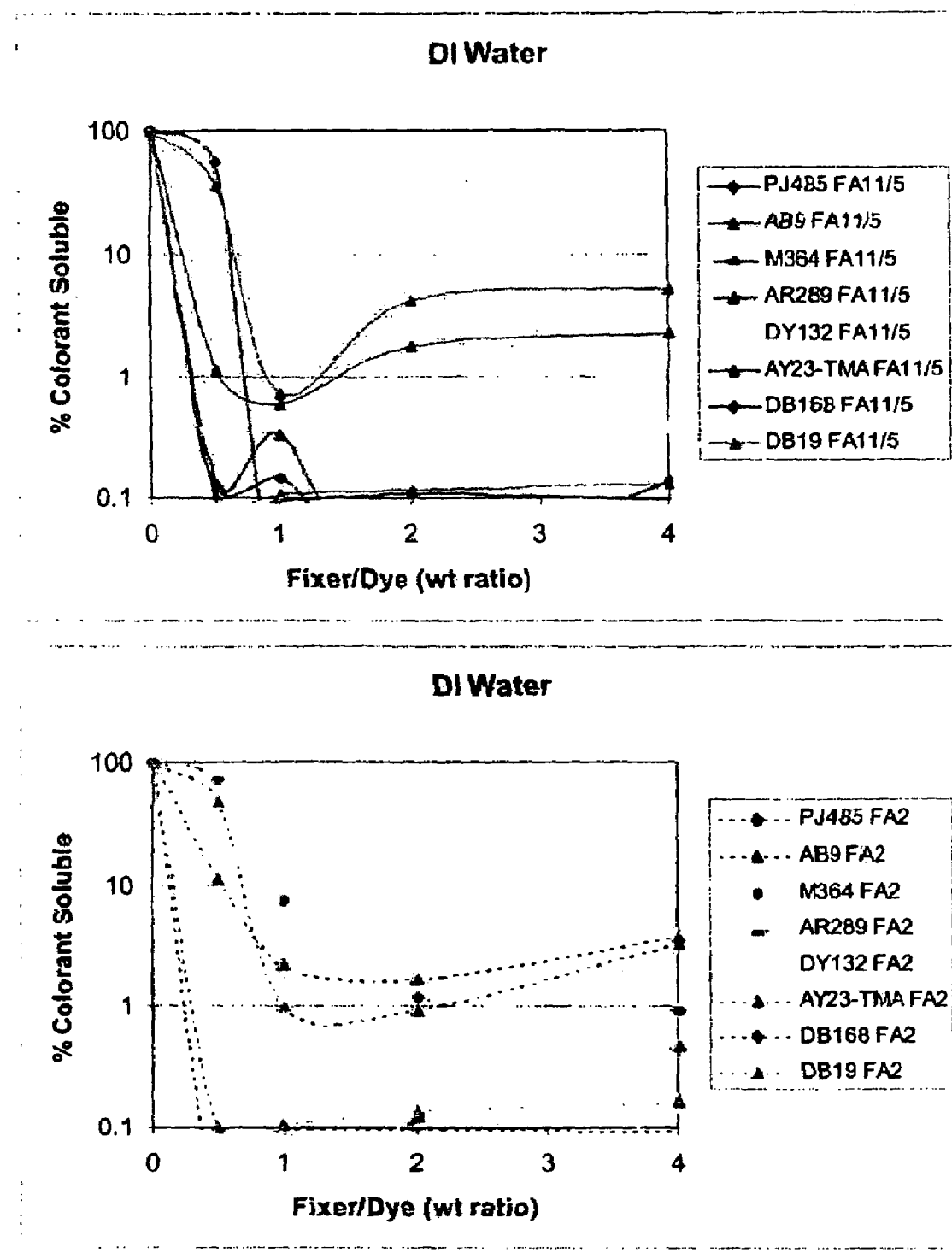
FIG. 1A (Top)
FIG. 1B (Bottom)

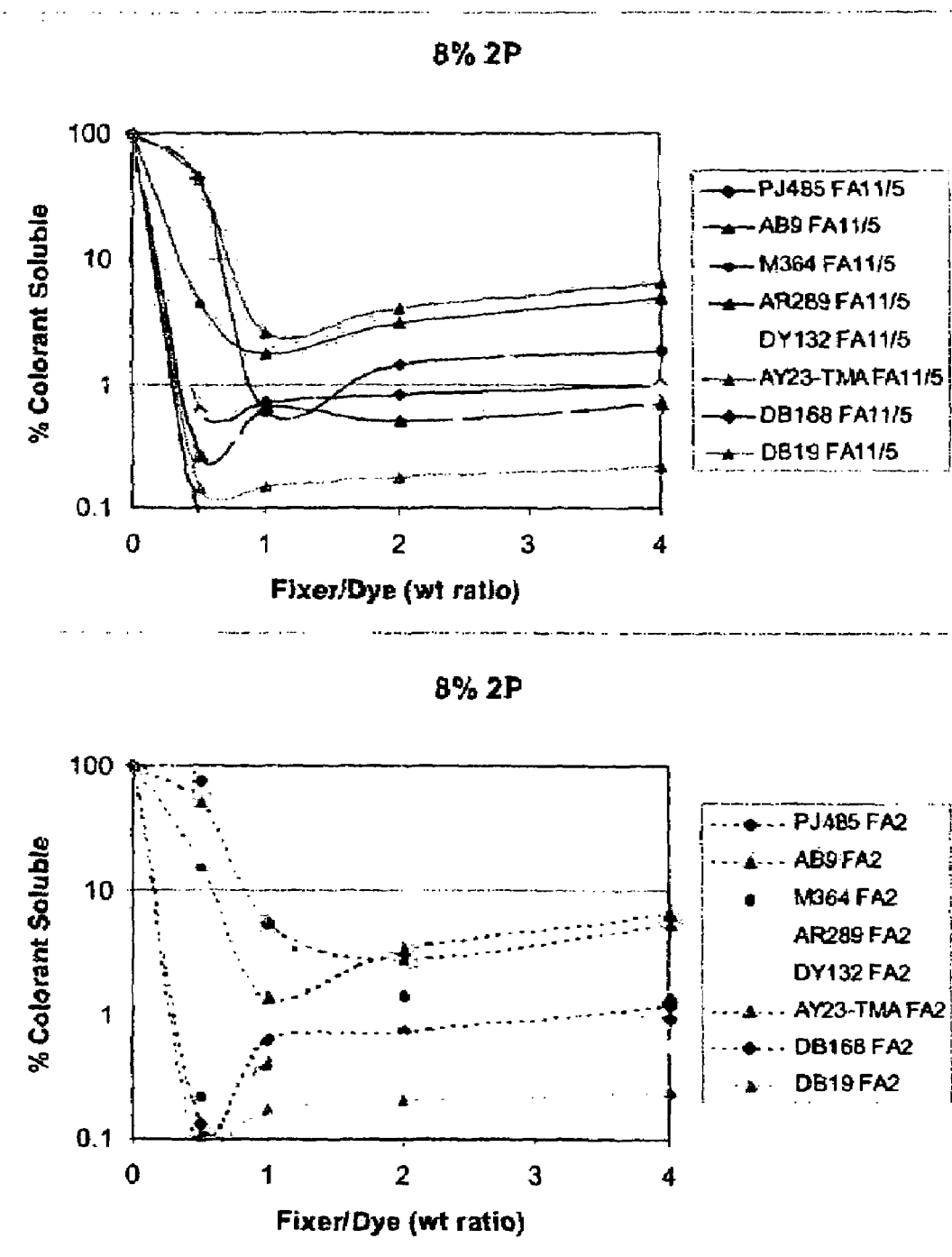
FIG. 2A (Top)
FIG. 2B (Bottom)

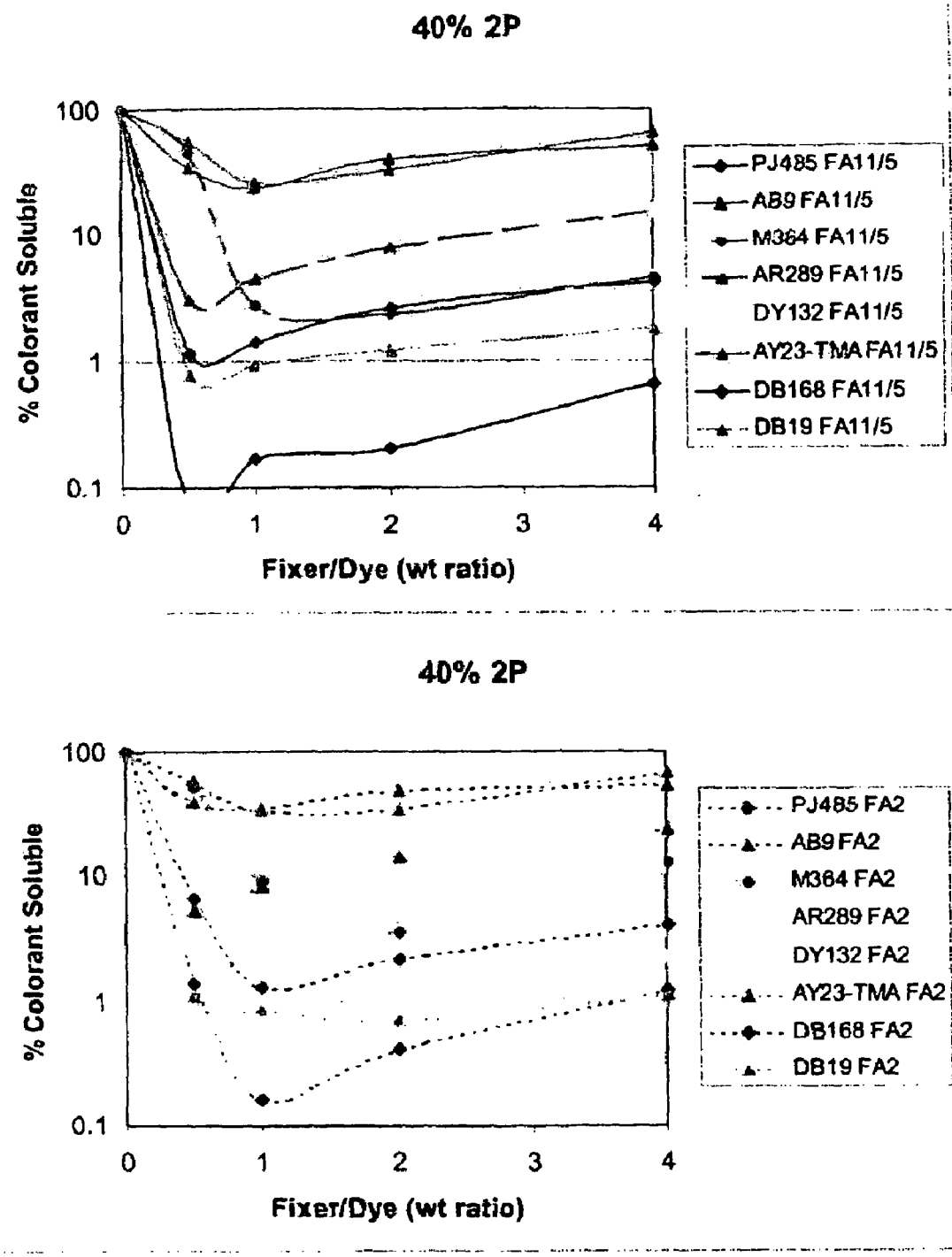
FIG. 3A (Top)
FIG. 3B (Bottom)

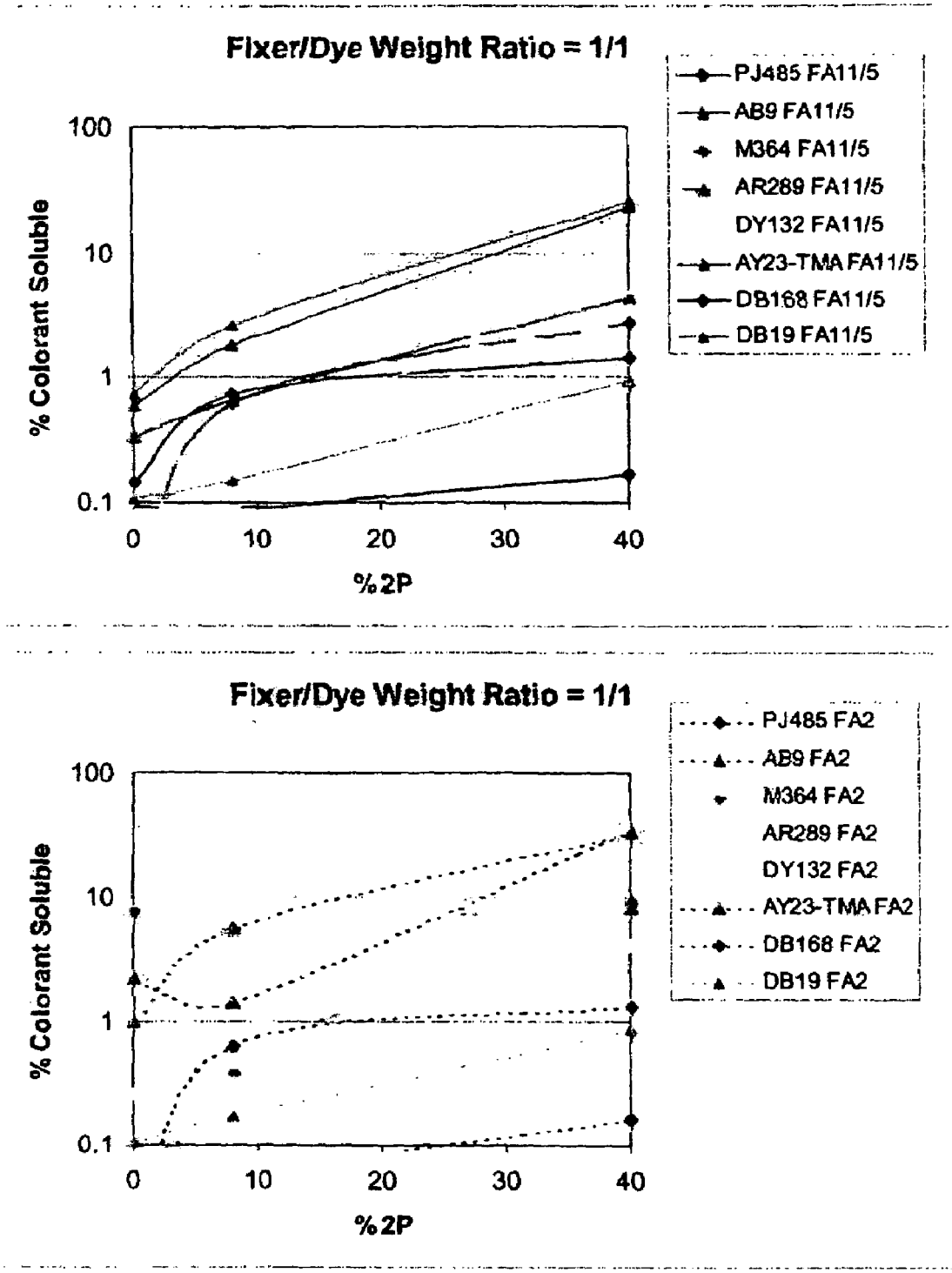
FIG. 4A (Top)
FIG. 4B (Bottom)

DISSOLVING COMPLEXES OF ANIONIC DYE/CATIONIC POLYMERIC FIXER

This is a division of application Ser. No. 10/354,624, filed Jan. 28, 2003 now U.S. Pat. No. 6,998,429.

FIELD OF THE INVENTION

In inkjet printing, anionic dye and cationic polymer fixer are often used. Together they form a complex that sometimes must be dissolved and removed from places where it has formed, such as the printhead.

BACKGROUND OF THE INVENTION

Dye-based inkjet inks have become a dominant technology in the inkjet ink arena. However, as many dyes are water-soluble, images printed using many of such dye-based inkjet inks are not as waterfast as may be desirable. The waterfastness and durability of anionic dye-based inkjet ink printed on media has been shown to be enhanced by overprinting or underprinting the printed image with a fixer, preferably from a separate pen. Fixers work to crash the colorants, e.g. anionic dyes, anionic pigments or carboxylated dyes, by changing the pH of the printed inkjet image or by adding salts such as $Ca^{2+}$ and $Mg^{2+}$ to the printed inkjet image. These fixers had the disadvantages of lacking durability, of causing pen wear and tear and corrosion due to the high salt content and the low pH.

More recently, cationic polymers have been used in the fixer. Thus, when the cationic polymer and the anionic dye contact one another on a substrate, a reaction between the dye and the polymer creates an image with improved durability and waterfastness. Inkjet images with improved waterfastness and durability can therefore be obtained by underprinting or overprinting a printed inkjet image with a cationic polymeric fixer.

Thus, anionic inks can be rendered more durable by printing with a fluid containing a cationic polymer. Sometimes during printing, the ink and the polymer fluids come into contact on the surface of one of the printheads, creating a durable complex which is difficult to remove with such servicing fluids as 1,2 hexanediol, glycerol and water.

SUMMARY OF THE INVENTION

The present invention relates to a method of dissolving an anionic dye/cationic polymer complex comprising the step of applying to the complex a water-soluble solvent having a dielectric constant from 20 to 43 at standard temperature and pressure.

The present invention additionally relates to an inkjet printhead cleaning system, wherein an anionic dye/cationic polymer complex on the printhead is removed by applying to the complex on the printhead a water-soluble solvent having a dielectric constant from 20 to 43 at standard temperature and pressure.

Also, the present invention relates to a method of removing an anionic dye/cationic polymer complex from an inkjet printhead, comprising the step of applying to the complex on the printhead a water-soluble solvent having a dielectric constant from 20 to 43 at standard temperature and pressure.

BRIEF DESCRIPTION OF THE DRAWINGS

For a detailed description of embodiments of the invention, reference will now be made to the accompanying drawings in which:

FIGS. 1A and 1B plot the Fixer/Dye ratio against the % Colorant Soluble for complexes of anionic dyes with cationic fixers in deionized (DI) water.

FIGS. 2A and 2B plot the Fixer/Dye ratio against the % Colorant Soluble for complexes of anionic dyes with cationic fixers in 8% 2P.

FIGS. 3A and 3B plot the Fixer/Dye ratio against the % Colorant Soluble for complexes of anionic dyes with cationic fixers in 40% 2P.

FIGS. 4A and 4B plot the %2P against the % Colorant Soluble with the Fixer/Dye Weight Ratio equal to 1/1.

DETAILED DESCRIPTION

In order to obtain images that are durable to highlighter smear or water drip and smudge, inks containing anionic dyes are underprinted and/or overprinted with fluids containing cationic polymers. The dye/polymer complex forms a durable mixture. When the ink and the polymer fluid end up on a printhead surface, the mixture is not easily removed by typical water-soluble servicing solvents such as 1,2-hexane diol, glycerol and water.

Effective and Ineffective Water Soluble Solvents

To study which water-soluble servicing solvents are best for removing the ink/polymer complex, the solubility of the precipitate formed between dye and fixers was evaluated in a variety of solvents. Specifically inks and fixers were pipetted onto cellulose TLC plates, dried and developed in a variety of solvents as described in Examples 1 and 2.

As shown in the Examples below, it was found that the dye/fixer complex precipitate is immobile in water, dipropylene glycol, 1,2 hexanediol, and 1,6-hexanediol indicating a lack of solubility in these solvents. In 2-amino-2-methyl propanol and 1,2 propanediol, it was found that some, but not all, of the complex precipitates are mobile, indicating that at least some of the complex precipitates are soluble in these solvents.

Also in the Examples, it is seen that all of the complex precipitates are mobile and therefore solubilized in 2-pyrrolidone, diethylene glycol, 1,2-propanediol, tetraethylene glycol, 1-methyl-2-pyrrolidone and n,n-dimethyl propionamide.

It has been found that 2-pyrrolidone is very effective at dissolving the dye-polymer complex. Furthermore, mixtures of 2-pyrrolidone and water are capable of dissolving the complex and are compatible with the printhead materials. The weight percentage ratio of 2-pyrrolidone to water can be from 100:0 to 20:80. In a preferred embodiment, the weight percentage ratio is 40:60.

It has also been found that 2-pyrrolidone inhibits precipitation of the anionic dye/cationic polymeric fixer complex as manifested by a greater equilibrium solubility and a slower precipitation rate. No precipitation was observed in systems containing more than 45 weight % 2-pyrrolidone.

Dielectric constants at standard temperature and pressure for most of the water-soluble servicing solvents tested have been obtained at standard temperature and pressure. Generally, it has been found that solvents that are "effective" at solubilizing anionic dye/cationic fixer complexes have dielectric constants that fall within the range of from approximately 20 to approximately 43 at standard temperature and pressure. In contrast, it has been found that solvents that are "ineffective" at solubilizing anionic dye/cationic fixer complexes have dielectric constants that fall outside the above range of 20-43 at standard temperature and pressure. Comparative tables are shown below:

| | Dielectric Constants at STP |
|---|---|
| "Effective" Solvents | |
| 2-pyrrolidone | 28.18 |
| Diethylene glycol | 31.82 |
| 1,2-propanediol | 32 |
| Tetraethylene glycol | 20.44 |
| 1-methyl-2-pyrrolidone | 32.2 |
| N,n-dimethylpropionamide | 34.6 |
| Triethylene glycol | 23.7 |
| 1,5-pentanediol | 26.2 |
| 1,4-pentanediol | 31.9 |
| "Ineffective" Solvents | |
| Water | 78 |
| Cyclohexanone | 16.1 |
| Butoxyethanol | 9.43 |
| Diacetone alcohol | 18.2 |
| 1-pentanol | 16.9 |
| 1,2-pentanediol | 17.3 |
| Glycerol | 46.5 |

Anionic Dyes Forming a Complex with Fixer

Non-limiting examples of anionic dyes that are effective with this invention are: direct black dyes, such as Direct Black 168 (DB168), Direct Black 19 (DB19) or variants of Fast Black 2; phthalocyanine cyan dyes, such as ProJet Cyan 485; acid cyan dyes, such as Acid Blue 9 (AB9); mixtures of acid cyan and phthalocyanine cyan, such as AB9 and ProJet Cyan 485 (PJ485); gamma acid magenta dyes, such as Magenta 377 (M377); H-acid magenta dyes, such as ProJet Magenta 364 (M364); Xanthene magenta dyes, such as Acid Red 289 (AR289); mixtures of H-acid magenta and Xanthene magenta dyes, such as mixtures of ProJet Magenta 364 and AR289; direct yellow dyes, such as Direct Yellow 132 (DY132); acid yellow dyes such as Acid Yellow 23 (AY23); and mixtures of direct yellow dyes and acid yellow dyes, such as mixtures of DY132 and AY23.

Cationic Polymeric Fixers Forming a Complex with Anionic Dyes

In a preferred embodiment of the fixer, polyguanidines and polyethyleneimines, have been found to be effective cationic polymers for this purpose.

In a more preferred embodiment, the cationic polymers are polymonoguanidines, preferably poly ($C_{3-18}$-hydrocarbyl monoguanidines).

In a most preferred embodiment, the poly($C_{3-18}$-hydrocarbyl monoguanidines) comprise groups selected from the group consisting of Formula (1) and Formula (2) or salts thereof:

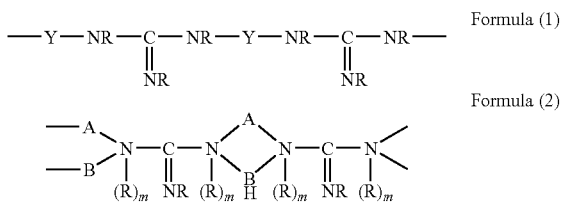

Formula (1)

Formula (2)

wherein:
each m is independently 0 or 1;
each Y is independently a $C_{2-18}$-hydrocarbyl group;
A and B are hydrocarbyl groups which together comprise a total of 3 to 18 carbon atoms; and
each R is independently hydrogen, alkyl, alkoxy, substituted alkyl or substituted alkoxy.

In another most preferred embodiment, the poly($C_{3-18}$-hydrocarbyl monoguanidines) comprise at least one group of Formula (3) or salts thereof:

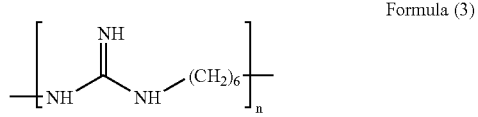

Formula (3)

wherein:
n is from 2 to 50.

EXAMPLES

Example 1

For each of Runs 1, 2 and 3, 1 microliter anionic dye-based ink and cationic polymeric fixer is pipetted in the order Fixer/Color/Fixer for each of colors black, cyan, magenta and yellow onto cellulose thin layer chromatography (TLC) plates. The three TLC plates were dried for 30 minutes at ambient temperature. The TLC plates were developed in solvent at 55° C.

The table below summarizes the mobility of Run 1, Run 2, and Run 3 dye/fixer complex/precipitates in various water-based servicing solvents.

TABLE 1

| Run/Ink | Dye | Fixer | Dipropylene glycol | 1,2 Hexanediol | Water | Tetraethylene glycol | Diethylene glycol | 2-pyrrolidone |
|---|---|---|---|---|---|---|---|---|
| Run 1/K | Direct Black | Poly-alkyl amine | Immobile | Immobile | Immobile | Slight | Slight | Moderate |
| Run 1/C | Phthalocyanine cyan | Poly-alkyl amine | Immobile | Immobile | Immobile | Immobile | Immobile | Slight |
| Run 1/M | Gamma acid magenta | Poly-alkyl amine | Immobile | Immobile | Immobile | Immobile | Immobile | Completely |
| Run 1/Y | Direct yellow | Poly-alkyl amine | Immobile | Immobile | Immobile | Slight | Moderate | Completely |
| Run 2/K | Direct Black (different from 1/K) | Poly-guanidine | Immobile | Immobile | Immobile | Slight | Slight | Moderate |

TABLE 1-continued

| Run/Ink | Dye | Fixer | Dipropylene glycol | 1,2 Hexanediol | Water | Tetraethylene glycol | Diethylene glycol | 2-pyrrolidone |
|---|---|---|---|---|---|---|---|---|
| Run 2/C | Phthalocyanine cyan | Poly-guanidine | Immobile | Immobile | Immobile | Immobile | Immobile | Slight |
| Run 2/M | H-acid magenta | Poly-guanidine | Immobile | Immobile | Very slight | Slight | Moderate | Moderate |
| Run 2/Y | Direct yellow | Poly-guanidine | Immobile | Immobile | Immobile | Slight | Moderate | Completely |
| Run 3/K | Direct Black (different from 1/K) | Poly-guanidine | Immobile | Immobile | Immobile | Slight | Slight | Moderate |
| Run 3/C | Mixture of acid cyan and phthalocyanine cyan | Poly-guanidine | Immobile | Immobile | Immobile | Slight | Slight | Moderate |
| Run 3/M | Mixture of H-acid magenta and xanthene magenta | Poly-guanidine | Very slight | Very slight | Very slight | Slight | Moderate | Moderate |
| Run 3/Y | Mixture of direct yellow and acid yellow | Poly-guanidine | Immobile | Immobile | Very slight | Slight | Moderate | Completely |

Example 2

For each of Runs 4, 5 and 6, 1 microliter anionic dye-based ink and cationic polymeric fixer is pipetted in the order Fixer/Color/Fixer for each of colors black, cyan, magenta and yellow onto cellulose TLC plates. The three TLC plates were dried for 30 minutes at ambient temperature. The TLC plates were developed in various water-based servicing solvent at 55° C.

The table below summarizes the mobility of Run 3, Run 4, and Run 5 dye/fixer complex/precipitates in the various solvents.

TABLE 2

| Fixer/Ink | Dye | Fixer | Cyclohexanone | Butoxy-ethanol | Diacetone alcohol | 2-amino-2-methyl propanol (AMP) | 1,2-propanediol |
|---|---|---|---|---|---|---|---|
| Run 4/K | Direct Black | Polyalkyl amine | Immobile | Immobile | Immobile | Moderate | Slight |
| Run 4/C | Phthalocyanine cyan | Polyalkyl amine | Immobile | Immobile | Immobile | Completely | Immobile |
| Run 4/M | Gamma acid magenta | Polyalkyl amine | Immobile | Immobile | Immobile | Moderate | Very slight |
| Run 4/Y | Direct yellow | Polyalkyl amine | Immobile | Immobile | Immobile | Completely | Slight |
| Run 5/K | Direct Black (different from 1/K) | Poly-guanidine | Immobile | Immobile | Immobile | Immobile | Slight |
| Run 5/C | Phthalocyanine cyan | Poly-guanidine | Immobile | Immobile | Immobile | Immobile | Very slight |
| Run 5/M | H-acid magenta | Poly-guanidine | Immobile | Immobile | Immobile | Immobile | Moderate |
| Run 5/Y | Direct yellow | Poly-guanidine | Immobile | Immobile | Immobile | Slight | Moderate |
| Run 6/K | Direct Black (different from 1/K) | Poly-guanidine | Immobile | Immobile | Immobile | Slight | Slight |
| Run 6/C | Mixture of acid cyan and phthalocyanine cyan | Poly-guanidine | Immobile | Immobile | Immobile | Slight | Moderate |
| Run 6/M | Mixture of H-acid magenta and xanthene magenta | Poly-guanidine | Very slight | Very slight | Very slight | Slight | Moderate |

TABLE 2-continued

| Fixer/Ink | Dye | Fixer | Cyclohexanone | Butoxy-ethanol | Diacetone alcohol | 2-amino-2-methyl propanol (AMP) | 1,2-propanediol |
|---|---|---|---|---|---|---|---|
| Run 6/Y | Mixture of direct yellow and acid yellow | Polyguanidine | Immobile | Immobile | Immobile | Slight | Moderate |

Example 3

A stock solution of ink containing anionic dye, Acid Blue 9(AB9), and fixer containing cationic polymer, Polyguanidine, are diluted with ratios of water and 2-P. For steady state solubility, equal volumes of the ink solutions and the fixer solutions are mixed. Solubility is determined by examining the mixture for precipitate after 1-day at ambient conditions Stock solutions are listed in Table 3A below:

TABLE 3A

| Ink A | | FIXER B | |
|---|---|---|---|
| Components | % active | Components | % active |
| Dye AB-9 | 6 | Polyguanidine | 4 |
| Bis(2-ethylhexyl)sulfosuccinate | 0.90 | 1,2-Hexanediol | 7.5 |
| Fluorocarbon surfactant | 0.30 | 2,3,4,5-Tetrahydrothiophene-1,1-dioxide | 7.5 |
| 4-Octylphenol Polyethoxylate | 0.4 | Fluorocarbon surfactant | 0.3 |
| Na$_2$EDTA | 0.2 | POE (4) lauryl ether | 0.4 |
| MOPS | 0.4 | B-Alanine | 0.2 |
| | | Na$_2$EDTA | 0.05 |

Table 3B below summarizes the solubility of Ink A and the Polyguanidine Fixer at various water/2P ratios. The concentration of 2-pyrrolidone has a strong effect on the interaction of the dye and fixer. Increasing the concentration of 2-P increases the solubility of the dye/fixer complex.

| Sample | Weight % (Dye) | Weight % water | Weight % 2P | ppt with Sample X | ppt with Sample Y |
|---|---|---|---|---|---|
| 1 | 0.60 | 90 | 0 | Yes | Yes |
| 2 | 0.60 | 80 | 20 | Yes | Yes |
| 3 | 0.60 | 60 | 40 | Yes | None |
| 4 | 0.60 | 40 | 60 | Yes | None |
| 5 | 0.60 | 20 | 80 | Yes | None |
| 6 | 0.60 | 0 | 90 | None | None |

| Sample | Weight % (Fixer) | Weight % water | Weight % 2P |
|---|---|---|---|
| X | 2 | 98 | 0 |
| Y | 2 | 48 | 50 |

In >45% 2-P, Ink A/Polyguanidine Fixer complex does not precipitate.

Example 4

The solubility of the DB168 Dye/Polyguanidine Fixer complex was tested in various solvents. Dye and fixer were added to aqueous cosolvent solutions to attain a concentration of 9.4 g/L DB168 Dye and 9.4 g/L Polyguanidine Fixer—the resulting mixture partitions into a liquid supernatant phase and a solid precipitate phase. Entries in Table 4 below represent the % of the total colorant that goes into the supernatant phase (100% would represent complete dye/fixer solubility in a solvent). The data shows that DB 168 Dye/Polyguanidine Fixer is the most soluble in 88% 2P—and that the reproducibility of this measurement is good (comparing '2P' and replicate '2P-2'). It also shows that the relative ability of solvents to dissolve the dye/fixer complex changes as water is taken out of the system. For example, at 44% aq TMS is a better solvent for DB 168 Dye/Polyguanidine Fixer than 44% aqueous TEG, but 88% aqueous TEG is a better solvent than 88% aqueous TMS.

| | 44% solvent | 88% solvent |
|---|---|---|
| 2-pyrrolidone | 0.28 | 34.27 |
| 2-pyrrolidone (rep 2) | 0.27 | 34.87 |
| 1,2-hexanediol | 0.11 | 0.18 |
| Tetramethylene sulfone | 0.38 | 7.63 |
| 1-methyl-2-pyrrolidone | 0.45 | 30.54 |
| 1,2-propanediol | 0.00 | 0.67 |
| Diethylene glycol | 0.00 | 3.47 |
| Tetraethylene glycol | 0.00 | 8.86 |
| Glycerol | 0.00 | 0.00 |
| Ethylene glycol | 0.00 | 0.40 |
| Tetrahydrofuran | 1.32 | 15.45 |
| n,n-dimethylpropionamide | 0.76 | 20.30 |

Example 5

Fixer-dye mixtures containing 0, 8, and 40% 2P were made by mixing 3% of dye in water or in 40% 2P with 3% of FA11/5 (polymonoguanidine) or FA2 (polybiguanadine) in water, pH adjusted to 4. Higher 2P-containing solutions (40% 2P in mixture) were prepared by mixing 3% dye in water with 6% FA11/5 or FA2 (in water, pH adjusted to 4) As dyes, PJ485, AB9, M364, AR289, DY132, AY23-TMA, DB19 and DB168 were used in this study. The samples were centrifuged.

The "Colorant Soluble" was plotted in FIGS. 1, 2, 3 in DI water, 8% 2P and 40% 2P, respectively, where "% Colorant Soluble" is defined as absorbance at $\lambda_{max}$ (w/o fixer). For DB168 and DB19, the minimum of "% Colorant Soluble" was reached at ~0.5 fixer/dye ratio. There was virtually no difference observed in "% Colorant Soluble" of the fixer-black dye complexes using FA2 or FA11/5.

Regardless of fixer type or % 2P present in the solution, fixer-DB168 complex is the least soluble. Fixer-DB19 complex was more soluble than fixer-DB168 complex but still less soluble than most of the fixer-color dye complexes.

As shown in FIG. 4, "% Colorant Soluble" increased with increasing % 2P. The amount of colorant soluble increased by roughly one order of magnitude from 0 to 40% 2P for most dyes including DB19. "% Colorant Soluble" of fixer-DB168 appeared to be insensitive to 2P content in this region.

Example 6

As in Example 1, 1 microliter anionic dye-based ink and cationic polymeric fixer is pipetted in the order Fixer/Color/Fixer for each of colors black, cyan, magenta and yellow onto cellulose thin layer chromatography (TLC) plates. The TLC plates were dried for 30 minutes at ambient temperature. The TLC plate was developed in solvent at 55° C.

The table below summarizes the mobility of Run 2 dye/fixer complex/precipitates in various additional water-based servicing solvents. The dielectric constants at standard temperature and pressure are given for each of the solvents. Both "ineffective" and "effective" solvents are included on the list. The more "effective" solvents tend to occur within the range of 20-41 dielectric constant at standard temperature and pressure.

TABLE 6

| Run/Ink | Dye | Fixer | 1-pentanol | 1,2-pentanediol | Triethylene glycol | 1,5-pentanediol | 1,4-butanediol | Ethylene glycol |
|---|---|---|---|---|---|---|---|---|
| Run 2/K | Direct Black | Poly-guanidine | Immobile | Slight | Slight | Immobile | Very slight | Slight |
| Run 2/C | Phthalocyanine cyan | Poly-guanidine | Immobile | Very slight | Slight | Slight | Slight | Moderate |
| Run 2/M | H-acid magenta | Poly-guanidine | Immobile | Very slight | Slight | Slight | Slight | Moderate |
| Run 2/Y | Direct yellow | Poly-guanidine | Immobile | Immobile | Slight | Very slight | Slight | Moderate |
| Dielectric Constants at STP | | | 16.9 | 17.3 | 23.7 | 26.2 | 31.9 | 41.4 |

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An inkjet printhead cleaning system, comprising:
an inkjet printer configured to print inks including anionic dyes and fixers including cationic polymers respectively as separate fluids such that complexes of anionic dyes and cationic polymers accumulate on a printhead of the printer and other surfaces of the printer as printing is conducted; and a water-soluble solvent and water mixture configured to be applied to the complexes accumulated on the surfaces throughout the printer, the solvent having a dielectric constant from 20 to 43 at standard temperature and pressure;
wherein the anionic dyes in the complex are selected from the group consisting of direct black dyes, phthalocyanine cyan dyes, acid cyan dyes, mixtures of acid cyan and phthalocyanine cyan, gamma acid magenta dyes, xanthene magenta dyes, mixtures of H-acid magenta and xanthene magenta dyes, direct yellow dyes, acid yellow dyes, and mixtures of direct yellow dyes and acid yellow dyes;
wherein the cationic polymers are selected from the group consisting of polyalkylamines, polyethyleneimines and polyguanadines;
and wherein the water-soluble solvent and water mixture is one of the following: at least 44 weight % of the water-soluble solvent, the water-soluble solvent selected from the group consisting of 1-methyl-2-pyrrolidone and n,n-dimethylpropionamide; at least 88 weight % of the water-soluble solvent, the water-soluble solvent selected from the group consisting of diethylene glycol, 1,2-propanediol, and tetraethylene glycol; or at least 40 weight % 2-pyrrolidone included in the solvent and water mixture.

2. The inkjet printhead cleaning system of claim 1, wherein the weight percent ratio of 2-pyrrolidone to water is 40:60.

3. The inkjet printhead cleaning system of claim 1 wherein the cationic polymers are polymonoguanadines.

4. The inkjet printhead cleaning system of claim 3 wherein the polymonoguanadines are poly($C_{3-18}$-hydrocarbyl monoguanidines).

5. The inkjet printhead cleaning system of claim 4 wherein the poly($C_{3-18}$-hydrocarbyl monoguanidine) comprises groups selected from the group consisting of Formula (1) and Formula (2) or salts thereof:

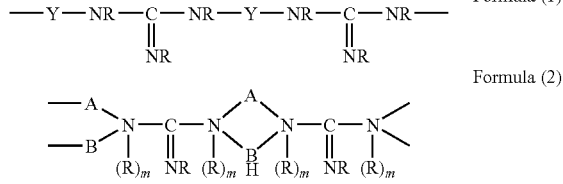

wherein:
each m is independently 0 or 1;
each Y is independently a $C_{2-18}$-hydrocarbyl group;
A and B are hydrocarbyl groups which together comprise a total of 3 to 18 carbon atoms; and
each R is independently hydrogen, alkyl, alkoxy, substituted alkyl or substituted alkoxy.

6. The inkjet printhead cleaning system of claim 4 wherein the poly($C_{3-18}$-hydrocarbyl monoguanidine) comprises at least one group of Formula (3) or salts thereof:

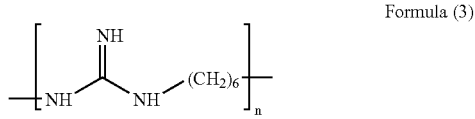

wherein:
n is from 2 to 50.

7. A method of removing an anionic dye/cationic polymer complex from an inkjet printhead and other surfaces of the printer as printing is conducted, comprising the step of applying to the complex on the printhead and other surfaces of the printer a water-soluble solvent and water mixture, the solvent having a dielectric constant from 20 to 43 at standard temperature and pressure;
wherein the anionic dyes in the complex are selected from the group consisting of direct black dyes, phthalocyanine cyan dyes, acid cyan dyes, mixtures of acid cyan and phthalocyanine cyan, gamma acid magenta dyes, xanthene magenta dyes, mixtures of H-acid magenta and xanthene magenta dyes, direct yellow dyes, acid yellow dyes, and mixtures of direct yellow dyes and acid yellow dyes;
wherein the cationic polymers are selected from the group consisting of polyalkylamines, polyethyleneimines and polyguanadines;
and wherein the water-soluble solvent and water mixture is one of the following: at least 44 weight % of the water-soluble solvent, the water-soluble solvent selected from the group consisting of 1-methyl-2-pyrrolidone and n,n-dimethylpropionamide; at least 88 weight % of the water-soluble solvent, the water-soluble solvent selected from the group consisting of diethylene glycol, 1,2-propanediol, and tetraethylene glycol; or at least 40 weight % 2-pyrrolidone included in the solvent and water mixture.

8. The method of claim 7, wherein the weight percent of 2-pyrrolidone to water 40:60.

9. The method of claim 7 wherein the cationic polymers are polymonoguanadines.

10. The method of claim 9 wherein the polymonoguanadines are poly ($C_{3-18}$-hydrocarbyl monoguanidines).

11. The method of claim 10 wherein the poly($C_{3-18}$-hydrocarbyl monoguanidine) comprises groups selected from the group consisting of Formula (1) and Formula (2) or salts thereof: t,0050
wherein:
each m is independently 0 or 1;
each Y is independently a $C_{2-18}$-hydrocarbyl group;
A and B are hydrocarbyl groups which together comprise a total of 3 to 18 carbon atoms; and
each R is independently hydrogen, alkyl, alkoxy, substituted alkyl or substituted alkoxy.

12. The method of claim 10 wherein the poly($C_{3-18}$-hydrocarbyl monoguanidine) comprises at least one group of Formula (3) or salts thereof:

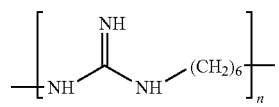

Formula (3)

wherein:
n is from 2 to 50.

13. A method of using a water-soluble solvent and water mixture, the solvent having a dielectric constant from 20 to 43 at standard temperature and pressure to remove an anionic dye/cationic polymer complex from an inkjet printhead and other surfaces of the printer as printing is conducted, comprising the step of applying the complex onto the printhead;
wherein the anionic dye in the complex is selected from the group consisting of direct black dyes, phthalocyanine cyan dyes, acid cyan dyes, mixtures of acid cyan and phthalocyanine cyan, gamma acid maaenta dyes, xanthene magenta dyes, mixtures of H-acid magenta and xanthene magenta dyes, direct yellow dyes, acid yellow dyes, and mixtures of direct yellow dyes and acid yellow dyes;
wherein the cationic polymer is selected from the group consisting of polyalkylamines, polyethyleneimines and polyguanadines;
and wherein the water-soluble solvent and water mixture is one of the following: at least 44 weight % of the water-soluble solvent, the water-soluble solvent selected from the group consisting of 1-methvl-2-pyrrolidone and n,n-dimethylpropionamide; at least 88 weight % of the water-soluble solvent, the water-soluble solvent selected from the group consisting of diethylene glycol, 1,2-propanediol, and tetraethylene glycol, or at least 40 weight % 2-pyrrolidone included in the solvent and water mixture.

14. The method of claim 13, wherein the weight percent ratio of 2-pyrrolidone to water 40:60.

15. The method of claim 13 wherein the cationic polymers are polymonoguanadines.

16. The method of claim 15 wherein the polymonoguanadines are poly ($C_{3-18}$-hydrocarbyl monoguanidines).

17. The method of claim 16 wherein the poly($C_{3-18}$-hydrocarbyl monoguanidine) comprises groups selected from the group consisting of Formula (1) and Formula (2) or salts thereof:

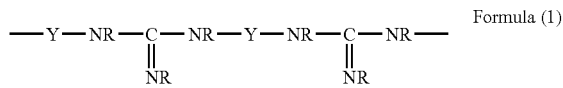

Formula (1)

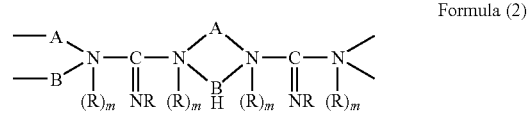

Formula (2)

wherein:
each m is independently 0 or 1;
each Y is independently a $C_{2-18}$-hydrocarbyl group;
A and B are hydrocarbyl groups which together comprise a total of 3 to 18 carbon atoms; and
each R is independently hydrogen, alkyl, alkoxy, substituted alkyl or substituted alkoxy.

18. The method of claim 16 wherein the poly($C_{3-18}$-hydrocarbyl monoguanidine) comprises at least one group of Formula (3) or salts thereof:

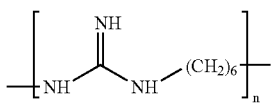

Formula (3)

wherein:
n is from 2 to 50.

* * * * *

UNITED STATES PATENT AND TRADEMARK OFFICE
CERTIFICATE OF CORRECTION

| | |
|---|---|
| PATENT NO. | : 7,654,633 B2 |
| APPLICATION NO. | : 11/256136 |
| DATED | : February 2, 2010 |
| INVENTOR(S) | : Christian Schmid et al. |

It is certified that error appears in the above-identified patent and that said Letters Patent is hereby corrected as shown below:

In column 9, line 65, in Claim 1, delete "polyguanadines" and insert -- polyguanidines --, therefor.

In column 10, line 12, in Claim 3, delete "polymonoguanadines" and insert -- polymonoguanidines --, therefor.

In column 10, line 14, in Claim 4, delete "polymonoguanadines" and insert -- polymonoguanidines --, therefor.

In column 11, line 18, in Claim 7, delete "polyguanadines" and insert -- polyguanidines --, therefor.

In column 11, line 29, in Claim 8, after "percent" insert -- ratio --.

In column 11, line 32, in Claim 9, delete "polymonoguanadines" and insert -- polymonoguanidines --, therefor.

In column 11, lines 33-34, in Claim 10, delete "polymonoguanadines" and insert -- polymonoguanidines --, therefor.

In column 11, line 38, in Claim 11, after "thereof:" delete "t,0050".

Signed and Sealed this
Twenty-fourth Day of May, 2011

David J. Kappos
*Director of the United States Patent and Trademark Office*

CERTIFICATE OF CORRECTION (continued)
U.S. Pat. No. 7,654,633 B2

In column 11, line 39, in Claim 11, above "wherein:"

Formula (1)

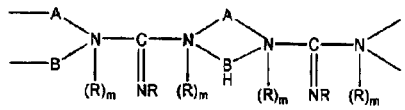

Formula (2)

insert --         -- .

In column 11, line 58, in Claim 12, delete "2to" and insert -- 2 to --, therefor.

In column 12, line 4, in Claim 13, delete "maaenta" and insert -- magenta --, therefor.

In column 12, line 11, in Claim 13, delete "polyguanadines" and insert -- polyguanidines --, therefor.

In column 12, line 15, in Claim 13, delete "methvl" and insert -- methyl --, therefor.

In column 12, line 19, in Claim 13, delete "glycol," and insert -- glycol; --, therefor.

In column 12, line 25, in Claim 15, delete "polymonoguanadines" and insert -- polymonoguanidines --, therefor.

In column 12, lines 26-27, in Claim 16, delete "polymonoguanadines" and insert -- polymonoguanidines --, therefor.

In column 12, line 62, in Claim 18, delete "2to" and insert -- 2 to --, therefor.